United States Patent
Ortiz et al.

(10) Patent No.: US 12,453,939 B2
(45) Date of Patent: Oct. 28, 2025

(54) SEPARATION OF GASES FROM AIR

(71) Applicant: Arkema France, Colombes (FR)

(72) Inventors: Guillaume Ortiz, Lacq (FR); Quitterie Persillon, Lacq (FR)

(73) Assignee: Arkema France, Puteaux (FR)

( * ) Notice: Subject to any disclaimer, the term of this patent is extended or adjusted under 35 U.S.C. 154(b) by 374 days.

(21) Appl. No.: 17/776,854

(22) PCT Filed: Nov. 23, 2020

(86) PCT No.: PCT/FR2020/052148
§ 371 (c)(1),
(2) Date: May 13, 2022

(87) PCT Pub. No.: WO2021/105598
PCT Pub. Date: Jun. 3, 2021

(65) Prior Publication Data
US 2022/0387923 A1     Dec. 8, 2022

(30) Foreign Application Priority Data

Nov. 27, 2019 (FR) .................................. 1913287

(51) Int. Cl.
*B01D 53/22* (2006.01)
*B01D 53/04* (2006.01)
*B01D 53/047* (2006.01)

(52) U.S. Cl.
CPC ..... *B01D 53/0407* (2013.01); *B01D 53/0476* (2013.01); *B01D 2253/1085* (2013.01);
(Continued)

(58) Field of Classification Search
CPC ...... B01D 2253/304; B01D 2259/4533; B01D 2253/1085; B01D 53/0407;
(Continued)

(56) References Cited

U.S. PATENT DOCUMENTS 3,773,690 A * 11/1973 Heinze ................ C01B 33/2815
502/67
5,152,813 A    10/1992 Coe et al.
(Continued)

FOREIGN PATENT DOCUMENTS

EP           0170299 A2    2/1986
EP           0893157 A1    1/1999
(Continued)

OTHER PUBLICATIONS

NASA "Air Mass/Density" 2 pages retrived 2024 https://www.earthdata.nasa.gov/topics/atmosphere/atmospheric-pressure/air-mass-density (Year: 2024).*
(Continued)

*Primary Examiner* — Anthony R Shumate
(74) *Attorney, Agent, or Firm* — Buchanan Ingersoll & Rooney PC (57) ABSTRACT

The present invention relates to the use of a zeolitic adsorbent material based on faujasite (FAU) zeolite crystals, the Si/Al mole ratio of which is between 1.00 and 1.20, and the non-zeolitic phase (NZP) content of which is such that 0<NZP≤25%, for the non-cryogenic separation of industrial gases by (V)PSA, in particular of the air gases.
The invention also relates to respiratory assistance machines comprising at least said zeolitic adsorbent material.

7 Claims, 1 Drawing Sheet

(52) U.S. Cl.
CPC .... *B01D 2253/304* (2013.01); *B01D 2256/12* (2013.01); *B01D 2257/102* (2013.01); *B01D 2259/4146* (2013.01); *B01D 2259/4533* (2013.01); *B01D 2259/4541* (2013.01)

(58) Field of Classification Search
CPC ........ B01D 2259/4541; B01D 53/0476; B01D 2257/102; B01D 2259/4146; B01D 2256/12
See application file for complete search history.

(56) References Cited

U.S. PATENT DOCUMENTS

| | | | |
|---|---|---|---|
| 5,464,467 A | 11/1995 | Fitch et al. | |
| 6,027,548 A | 2/2000 | Ackley et al. | |
| 6,171,370 B1 * | 1/2001 | Hirano | B01D 53/02 95/902 |
| 6,596,256 B1 | 7/2003 | Ojo et al. | |
| 6,652,626 B1 | 11/2003 | Plee | |
| 6,743,745 B2 | 6/2004 | Jaussaud et al. | |
| 9,061,918 B2 | 6/2015 | Bouvier et al. | |
| 10,300,455 B2 | 5/2019 | Nicolas et al. | |
| 10,888,837 B2 | 1/2021 | Lutz et al. | |
| 11,007,505 B2 | 5/2021 | Ortiz et al. | |
| 2015/0298096 A1 * | 10/2015 | Gleichmann | B01D 53/02 502/79 |
| 2017/0274350 A1 * | 9/2017 | Nicolas | C01B 39/205 |
| 2018/0008955 A1 * | 1/2018 | Lutz | B01J 20/186 |

FOREIGN PATENT DOCUMENTS

| | | |
|---|---|---|
| EP | 1285691 A1 | 2/2003 |
| FR | 2925478 A1 | 6/2009 |
| FR | 3032130 A1 | 8/2016 |
| WO | 2009081022 A2 | 7/2009 |
| WO | 2018100318 A1 | 6/2018 |

OTHER PUBLICATIONS

International Search Report and Written Opinion for International Application No. PCT/FR2020/052148, dated Feb. 10, 2021, 9 pages.

* cited by examiner

SEPARATION OF GASES FROM AIR

CROSS-REFERENCE TO RELATED APPLICATIONS

This application is the U.S. national phase of International Application No. PCT/FR2020/052148, filed Nov. 23, 2020, which claims priority to French Application No. FR 1913287, filed Nov. 27, 2019, the disclosure of each of these applications being incorporated herein by reference in its entirety for all purposes.

FIELD OF THE INVENTION

The invention relates to the separation of industrial gases by (V)PSA, in particular the separation of the nitrogen and oxygen contained in the air, one entirely appropriate application being the preparation of medical oxygen, other possible applications being VPSA applications for the preparation of industrial oxygen.

More precisely, the present invention relates to the use of specific adsorbent materials for the separation of air gases and industrial gases, and more particularly for the separation of nitrogen by adsorption in gas streams such as air, and also to the preparation of oxygen ($O_2$) of high purity by adsorption of nitrogen ($N_2$), and more particularly the preparation of oxygen for medical use from air.

BACKGROUND OF THE INVENTION

The separation of nitrogen from gas mixtures lies at the base of several non-cryogenic industrial processes, including the production of oxygen from air by the process of PSA (Pressure Swing Adsorption) or VPSA (Vacuum and Pressure Swing Adsorption), with the PSA process being one of the most important.

In this application, air is compressed and sent to a column of adsorbent having a marked preference for the nitrogen molecule. In this way, during the adsorption cycle, oxygen is produced, in a purity of about 94-95%, along with argon. After a certain time, the column is depressurized and then maintained at the low pressure, during which period the nitrogen is desorbed. Recompression is then ensured by means of a part of the oxygen produced and/or by air, and then the cycle continues. The advantage of this process over the cryogenic processes commonly performed lies in the greater simplicity of the facilities, greater ease of maintenance, and consequently more efficient uses and more economic implementations, in particular for small to medium-sized facilities, i.e. facilities producing a few tens of tonnes or less of purified gas per day.

The quality of the adsorbent used however remains the key to an efficient and competitive process. The performance of the adsorbent is linked to a number of factors, among which mention may notably be made of the nitrogen adsorption capacity and the selectivity between nitrogen and oxygen, which will be determining factors in the sizing of the column and the optimization of the production yield (ratio between the oxygen produced and the oxygen introduced), and the adsorption kinetics, which will enable the cycle time to be optimized and the productivity of the facility to be improved.

U.S. Pat. No. 6,596,256 B1 discloses a process for preparing sodium LSX and sodium MSX zeolites, without adding potassium. The zeolites thus prepared are then subjected to cationic exchange with lithium ions, calcium ions, rare-earth metal cations, or mixtures of these cations, before being used, for example for nitrogen/oxygen separation, in the case of lithium-exchanged LSX zeolite.

U.S. Pat. No. 5,464,467 A describes a process for preparing nitrogen from a gas mixture, comprising the passage of said gas mixture into at least one adsorption zone containing a type X zeolite comprising from 50% to about 95% of lithium ions. Such lithium zeolites have entirely advantageous oxygen production capacities, which are notably better than the adsorption capacities obtained with the zeolites of the prior art, or comprising other cations.

Zeolitic adsorbents based on faujasite (FAU) type zeolites are also known, and in particular the adsorbents based on lithium-exchanged zeolites with a low silicon/aluminum mole ratio (LiLSX) which are described, for example, in international patent application WO 2018/100318. These adsorbents have proven not only to be entirely suitable but also very efficient for oxygen/nitrogen separation, and in particular for the preparation of medical oxygen from air.

The prior art consequently teaches those skilled in the art that the production of oxygen from gas mixtures (for example from a nitrogen/oxygen mixture or from air) is optimized by using zeolite adsorbents based on type X zeolites, better still based on LSX zeolites, which include lithium ions.

In point of fact, lithium-exchanged zeolitic adsorbents are now sold for nitrogen/oxygen separation, these zeolites being considered the most efficient. However, lithium-exchanged adsorbents suffer from a relatively high manufacturing cost notably on account of the inherent cost of lithium metal, which is a metal whose natural resources are in continuous decline.

In order to overcome these drawbacks and notably to reduce the use of zeolitic adsorbents comprising lithium, U.S. Pat. No. 6,027,548 A proposes to use multilayer adsorbent columns superposing adsorbents of NaX and LiX type. Despite the relatively poor performance of adsorbents of NaX type compared with that of adsorbents of LiX type, the multilayer adsorbents described in said document are of moderate cost and are presented as having an advantageous cost/performance ratio.

Specifically, it is well known that adsorbents of NaX type can occasionally be used on account of their low manufacturing/marketing cost relative to lithium-exchanged adsorbents. Adsorbents of NaX type are, however, less efficient in terms of nitrogen adsorption capacity and nitrogen/oxygen selectivity.

A need consequently remains for affordable products that have good performance qualities in terms of nitrogen adsorption capacity and nitrogen/oxygen selectivity. Thus, a first object of the present invention is to propose affordable zeolitic adsorbents which have good or even very good performance qualities in terms of gas separation, notably in terms of nitrogen/oxygen separation, and more particularly in terms of the production of oxygen and notably of medical oxygen.

A most particularly targeted objective is a low-cost zeolitic adsorbent that is highly selective in nitrogen/oxygen separation, and which in particular has the capacity of retaining nitrogen without oxygen being retained, more particularly a zeolitic adsorbent which selectively adsorbs nitrogen, while not adsorbing or only very sparingly adsorbing oxygen.

SUMMARY OF THE INVENTION

One of the objects of the present invention notably consists in improving the existing sodium grade zeolitic adsorbents (also known as "sieves") for the separation of nitrogen and oxygen, by proposing solids which do not retain or only very sparingly retain oxygen and very preferentially retain nitrogen. Other further objectives will become apparent from the description of the invention which follows.

DETAILED DESCRIPTION OF THE INVENTION

Figure 1:
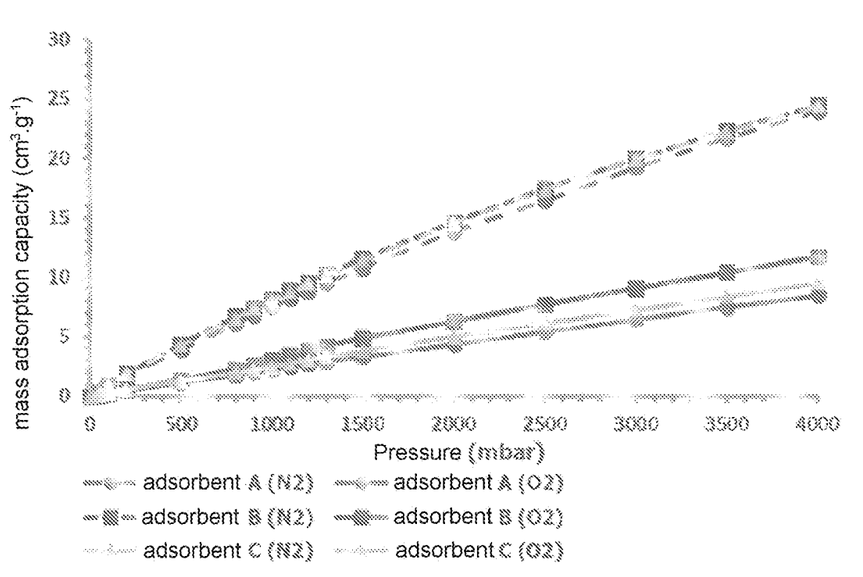
The FIGURE illustrates a graph of the nitrogen ($N_2$) and oxygen ($O_2$) isotherms for Example 1.

The applicant has now discovered that the abovementioned objects can be achieved, entirely or at least partly, by means of the present invention which follows and which is described hereinbelow.

It has now been discovered that it is possible to prepare zeolitic adsorbent materials from crystals of FAU type zeolite, for the non-cryogenic separation of industrial gases by (V)PSA, in particular for the separation of nitrogen and oxygen ($N_2/O_2$), and most particularly for the preparation of medical oxygen from air, and also for the industrial preparation of oxygen by (V)PSA.

Thus, according to a first aspect, a subject of the present invention is the use of a zeolitic adsorbent material:
 based on faujasite (FAU) zeolite crystals, the Si/Al mole ratio of which is between 1.00 and 1.20, better still between 1.00 and 1.15 and preferably between 1.00 and 1.12, limits inclusive,
 and with a content of non-zeolite phase (NZP) such that $0<NZP\leq25\%$, preferably $0<NZP\leq20\%$, more preferably $0<NZP\leq15\%$, advantageously $0<NZP\leq10\%$, even more advantageously $0<NZP\leq8\%$, by weight relative to the total weight of the zeolitic adsorbent material,
for the non-cryogenic separation of industrial gases by (V)PSA, in particular for the separation of nitrogen and oxygen ($N_2/O_2$), and typically for the preparation of medical oxygen from air, and also for the industrial preparation of oxygen by (V)PSA.

According to a preferred aspect, the sodium content of the zeolitic adsorbent that may be used in the context of the present invention is generally greater than 95%, preferably greater than 97%, more preferably greater than 98%, more preferably greater than 99%, limits inclusive, these sodium contents being expressed as percentages of exchangeable sites. With a sodium content of greater than 95%, the zeolitic adsorbent for use in the context of the present invention is referred to hereinbelow as a "sodium grade zeolitic adsorbent" or "sodium grade sieve".

For the needs of the present invention, it should be understood that the zeolites that may be used for forming the abovementioned zeolitic adsorbents are synthesized from sodium solutions and advantageously do not undergo any ion exchange or else an ion exchange such that the exchangeable sites of the zeolitic adsorbent after exchange are more than 95% occupied, preferably more than 97% occupied, more preferably more than 98% occupied and even more preferably more than 99% occupied, limits inclusive, with sodium ions.

Thus, according to a most particularly preferred embodiment of the present invention, the zeolitic adsorbents that may be used for the non-cryogenic separation of industrial gases and notably of air gases are sodium grade zeolitic adsorbents, the exchangeable sites of which are more than 95% occupied with sodium ions and of which the content of cations other than sodium is less than 5% expressed as oxides, and preferably less than 4%, better still less than 2%, the cations other than sodium being chosen from lithium, potassium, barium, calcium, strontium, caesium and transition metals such as silver, for example, and preferably chosen from lithium, potassium, calcium and barium.

In addition, the zeolite crystals which form the zeolitic adsorbents that may be used in the context of the present invention are zeolite crystals of faujasite type (known as FAU type zeolites), the silicon/aluminum mole ratio (Si/Al mole ratio) of which is low to moderate. In other words, the zeolite crystals which form the zeolitic adsorbent that may be used in the context of the present invention are chosen from FAU LSX type zeolite crystals, i.e. with an Si/Al ratio equal to 1.00, and FAU MSX type zeolites, i.e. with an Si/Al ratio corresponding to the inequation $1.00<Si/Al\leq1.20$.

It has been discovered, entirely surprisingly, that for similar nitrogen adsorption capacities, the oxygen adsorption capacities are proportionately lower the lower the Si/Al ratio of the zeolites of the sodium grade zeolitic adsorbents that may be used in the context of the invention. In other words, the lower the Si/Al ratio of the sodium grade zeolitic adsorbents, the less oxygen is adsorbed, whereas nitrogen is greatly adsorbed.

Thus, as indicated above, among the zeolites that may be used for the preparation of the zeolitic adsorbents that are useful for the present invention, preference is given to FAU type zeolites, which are LSX or MSX zeolites, and in particular FAU type zeolites wherein the Si/Al mole ratio is between 1.00 and 1.20, preferably between 1.00 and 1.15 and preferably between 1.00 and 1.12, limits inclusive.

According to one embodiment of the present invention, FAU LSX type zeolites (Si/Al mole ratio=1.00) are most particularly preferred for the preparation of the zeolitic adsorbents that may be used for nitrogen/oxygen separation.

The possible different types of zeolite present in the zeolitic adsorbent material are determined by XRD. The total amount of zeolite(s) is likewise measured by XRD and is expressed in weight percentages relative to the total weight of the adsorbent material.

In addition, as indicated previously, the zeolitic adsorbent material contains a certain amount of non-zeolitic phase, known as NZP. In the present invention, the term, "non-zeolitic phase", (or "NZP"), denotes any phase present in the zeolitic adsorbent material according to the invention, other than the zeolite(s) present in said zeolitic adsorbent material, which is called the "zeolitic phase", or "ZP". The amount of non-zeolitic phase is expressed by the balance to 100% of the zeolitic phase of the adsorbent, in other words according to the following equation:

% NZP=100–% ZP, where % NZP represents the weight percentage of NZP and % ZP the weight percentage of zeolitic phase, relative to the total weight of the zeolitic adsorbent material.

Thus, as indicated previously, the NZP of the zeolitic adsorbent material that is useful in the context of the present invention such that $0<NZP\leq25\%$, preferably $0<NZP\leq20\%$, more preferably $0<NZP\leq15\%$, advantageously $0<NZP\leq10\%$, even more advantageously $0<NZP\leq8\%$, by weight relative to the total weight of the zeolitic adsorbent material.

The zeolitic adsorbent material that may be used in the context of the present invention, whether in the form of beads, extrudates or other forms, generally has a volume-mean diameter, or a mean length (longest dimension when it is not spherical) of less than or equal to 7 mm, preferably between 0.05 mm and 5 mm, more preferably between 0.2 mm and 3 mm. For the needs of the present invention, a zeolitic adsorbent material in the form of beads is preferred.

The zeolitic adsorbent materials that are of use in the context of the present invention also have mechanical properties that are most particularly suitable for the applications to which they are destined, that is to say:

either a bulk crush strength (BCS), measured according to standard ASTM 7084-04, of greater than 1.5 MPa, preferably greater than 2.0 MPa, preferably greater than 2.5 MPa, for a material with a volume-mean diameter ($d_{50}$) or a length (longest dimension when the material is not spherical) of less than 1 mm, limits inclusive, or a pellet crush strength, measured according to standards ASTM D 4179 (2011) and ASTM D 6175 (2013), of between 0.5 daN and 30 daN, preferably between 1 daN and 20 daN, for a material with a volume-mean diameter ($d_{50}$) or a length (longest dimension when the material is not spherical) of greater than or equal to 1 mm, limits inclusive.

More specifically, and according to one preferred embodiment of the invention, the zeolitic adsorbent material takes the form of beads having an average volume diameter of between 0.05 mm and 5 mm, endpoints included. More preferably, and more specifically in applications for the preparation of oxygen for medical use, this volume-mean diameter is between 0.05 mm and 1.0 mm, more preferably between 0.15 mm and 0.65 mm, and entirely preferably between 0.25 mm and 0.55 mm. In applications such as the separation of industrial gases, this volume-mean diameter may more specifically and more generally be between 1.0 mm and 5.0 mm.

Another preferred feature of the zeolitic adsorbent material of the invention is its bulk density, which is generally between 0.55 kg·m$^{-3}$ and 0.80 kg·m$^{-3}$, preferably between 0.58 kg·m$^{-3}$ and 0.75 kg·m$^{-3}$, more preferably between 0.60 kg·m$^{-3}$ and 0.70 kg·m$^{-3}$.

The invention also relates to a process for preparing the zeolitic adsorbent material that may be used in the context of the present invention, which comprises the following steps:

a/ agglomerating crystals of FAU LSX and/or FAU MSX zeolite with an agglomerating binder, followed by forming, drying and calcining the agglomerated crystals, b/ optionally zeolitizing at least a portion of the binder by the action of a basic alkaline solution, c/ optionally replacing the cations of the exchangeable sites of the product obtained in step a/ or in step b/ with sodium cations, followed by washing and drying the product thus treated, and d/ activating the zeolitic adsorbent material obtained.

If the zeolitizing step b/ is performed, it may be advantageous to add a source of silica during step a/, notably so as to promote conversion of the binder into an FAU type zeolite.

The type of zeolite used in step a/ of the process described above is, as indicated previously, an FAU type zeolite with an Si/Al mole ratio of between 1.00 and 1.20, limits inclusive, as indicated previously.

These zeolite crystals may be prepared by any means known to those skilled in the art and may be obtained, for example, according to a process similar to that described in FR 2925478 or U.S. Pat. No. 6,596,256.

In the above preparation process, all of the amounts indicated are expressed in calcined equivalents, that is to say by weight or as weight percentages, with subtraction of the loss on ignition (LOI) measured on each ingredient introduced. It is also possible to use in this step a/ crystals of FAU type zeolite which has been at least partially exchanged with rare-earth metals, as described, for example, in U.S. Pat. No. 5464467.

The weight amount of crystals of FAU type zeolite is generally between 75% and 95% by weight, relative to the total weight of said product obtained at the end of step a/, and the amount of zeolitizable clay is, for its part, generally between 5% and 25% by weight, relative to the total weight of said product obtained on conclusion of step a/.

When a silica source is added, an amount of between 0.1% and 10% by weight, more preferably between 0.2% and 6% by weight, relative to the total weight of said product obtained on conclusion of step a/, is preferably added. The silica source that may be used is of any type known per se, for example solid silica, colloidal silica, sodium silicate, and other sources that are well known to those skilled in the art.

The shaping in step a/ is carried out according to the techniques well known to the person of skill in the art. Similarly, the drying and the calcining are carried out according to the usual descriptions which are likewise well known to the person skilled in the art. Accordingly, the drying is typically carried out at a temperature of between 50° C. and 200° C. The calcining may be performed by any calcining method known to the person skilled in the art, and for example, without limitation, the calcining may be performed under blanketing with inert and/or oxidizing gas, in particular with gases such as oxygen, nitrogen, air, dry and/or decarbonated air, oxygen-depleted air, which is optionally dry and/or decarbonated, at one or more temperatures greater than 200° C., typically of between 250° C. and 700° C., preferably between 300° C. and 650° C., for several hours, as for example between 1 and 6 hours.

The agglomeration binder used in step a/ may be chosen from the conventional binders known to those skilled in the art, and preferably chosen from clays and mixtures of clays, silicas, aluminas, colloidal silicas, alumina gels, and the like, and mixtures thereof.

The clays are preferably chosen from kaolins, kaolinites, nacrites, dickites, halloysites, attapulgites, sepiolites, montmorillonites, bentonites, illites and metakaolins, and also mixtures of two or more thereof in all proportions.

Preference is given to fibrous clays of sepiolite or attapulgite type, the clay(s) possibly, in general, being formulated in the form of powders that are dry-ground and selected, or better still of gel (i.e. delaminated clays) and dispersed, and optionally ground, such as the commercial clays Min-U-Gel®, Pansil®, Pangel®, Cimsil®, Attagel®, Actigel®, etc., which may or may not have undergone one or more chemical treatments. Such gels are described, for example, in EP170299 or U.S. Pat. No. 6743745.

In another preferred embodiment, the agglomerating binder used in step a/preferably contains at least 80% by weight of zeolitizable clay(s) (called the "zeolitizable part") relative to the total weight of the agglomerating binder.

The term "zeolitizable clay(s)" refers to a clay or a mixture of clays that can be converted into zeolitic material by the action of an alkaline basic solution, by techniques which are now well known to those skilled in the art.

The zeolitizable clays that may be used in the context of the present invention typically belong to the class of the kaolinites, halloysites, nacrites, dickites, kaolins and/or metakaolins, and a silica source may also be added to these clays, as described above.

It is also possible to incorporate, in addition to the zeolitizable clay(s), one or more other types of non-zeolitizable clays, for instance, and in a non-limiting manner, clays chosen from attapulgites, sepiolites, bentonites, montmorillonites, and others. This embodiment, however, is not preferred.

It is possible, furthermore, during the agglomeration step a/, to incorporate one or more organic additives, particularly with the aim of facilitating the shaping and/or of imparting particular properties to the agglomerated material, such as mechanical stability, porous profiles, and others. These additives are well known to the person skilled in the art and may be incorporated in quantities of between 0 and 5% by weight relative to the total weight of said product obtained at the end of step a/.

The zeolitizing step b/ enables the transformation into zeolitic material of at least 50%, and preferably of at least 70%, more preferably of at least 80% and more preferably of at least 85%, by weight of the zeolitizable clay(s) contained in the binder. In a preferred embodiment, the zeolitic adsorbent that may be used in the context of the present invention includes a binder that has not been zeolitized.

The zeolitizing may be performed by immersing the agglomerate in an alkaline basic solution, which is generally aqueous, advantageously an aqueous sodium hydroxide and/or potassium hydroxide solution, the concentration of which is preferably greater than 0.5 M. Said concentration is generally less than 5 M, preferably less than 4 M, advantageously less than 3 M.

The zeolitizing is preferably performed at elevated temperature (temperature above room temperature), typically at temperatures of the order of 80° C. to 100° C., so as to improve the kinetics of the process and thus to reduce the immersion times to less than 8 hours. Operating at lower temperatures and with longer immersion times would not be outside the scope of the invention, however. Nor would it be outside the scope of the invention to add, during this zeolitization step, a solid or liquid silica source to the basic alkaline solution, for example, sodium silicate or dissolved silica.

According to this procedure, and as indicated above, it is easy to accomplish zeolitization of at least 50%, and preferably at least 70%, more preferably at least 80% and more preferably at least 85%, by weight of the zeolitizable clay(s) contained in the binder. The next step is washing with water, followed by drying.

The optional step c/ of replacing the cations of the exchangeable sites of the product obtained in step b/ with sodium cations is not desirable, or even necessary, except for when the sodium content of the zeolite is such that less than 95% of the exchangeable sites are occupied with sodium ions. Such an exchange may then be performed according to methods that are well known to those skilled in the art, for instance such as those described in patent EP 0893157.

In the present patent application, the term "exchangeable sites" refers to all the exchangeable sites in the zeolite crystals and also to the exchangeable sides formed during zeolitization of the binder. In a preferred embodiment of the invention, the optional sodium exchange is performed such that the sodium content (expressed as a percentage of exchangeable sites) in the zeolitic adsorbent material of the invention is greater than or equal to 95%.

Besides the optional exchange with sodium cations, it is also possible to perform an exchange with one or more other cations from groups IA, IIA, IIIA and IIIB (columns 1, 2, 13 and 3, respectively) of the Periodic Table of the Elements, but also with one or more other trivalent ions of the lanthanide or rare-earth metal series, the zinc(II) ion, the copper(II) ion, the chromium(III) ion, the iron(III) ion, the ammonium ion and/or the hydronium ion, provided that the zeolitic adsorbent material of the invention has a content of exchangeable sites occupied with sodium ions at least equal to or greater than 95%.

The aim of the activation (step d/), the last step in the process for obtaining the zeolitic adsorbent material according to the invention, is to fix the water content and also the loss on ignition of the adsorbent within optimum limits. The general procedure is a thermal activation, which is performed preferably at between 300° C. and 650° C. for a certain time, typically from 1 to 6 hours, depending on the desired water content and desired loss on ignition and according to the intended use of the adsorbent. In one embodiment, the calcining in step a/ and the activation in step d/ may be performed concomitantly, i.e. at the same time in the same heated chamber, for example a furnace.

The zeolitic adsorbent material according to the present invention finds a most particularly advantageous use as a nitrogen-adsorbing material for the separation of air gases, and as excellent nitrogen adsorbents and/or carbon monoxide adsorbents for the purification of hydrogen.

The nitrogen ($N_2$) mass adsorption capacity of the zeolitic adsorbent material according to the present invention, measured under 4 bar (0.4 MPa) at 25° C., is usually greater than 23 $Ncm^3 \cdot g^{-1}$, preferably greater than 24 $Ncm^3 \cdot g^{-1}$, more preferably greater than 25 $Ncm^3 \cdot g^{-1}$ and most particularly preferably greater than 26 $Ncm^3 \cdot g^{-1}$.

As already indicated previously, it has been observed, entirely surprisingly, that the zeolitic adsorbent material according to the present invention also usually has an oxygen ($O_2$) mass adsorption capacity, measured under 4 bar (0.4 MPa) at 25° C., of less than 12 $Ncm^3 \cdot g^{-1}$, more preferably less than 11 $Ncm^3 \cdot g^{-1}$, more preferably less than 10 $Ncm^3 \cdot g^{-1}$ and most particularly preferably less than 9 $Ncm^3 \cdot g^{-1}$. In the present description, the term "nitrogen/oxygen selectivity" means the ratio between the nitrogen ($N_2$) mass adsorption capacity, measured under 4 bar (0.4 MPa) at 25° C. and the oxygen ($O_2$) mass adsorption capacity, measured under 4 bar (0.4 MPa) at 25° C., in other words the $N_2$ capacity/$O_2$ capacity ratio, the capacities being measured under 4 bar (0.4 MPa) at 25° C.

The adsorption processes employing the zeolitic adsorbent material according to the present invention are usually PSA, VSA or VPSA processes, and preferably PSA or VPSA processes, for $N_2/O_2$ separation in industrial gases and for $N_2/O_2$ separation in apparatus for producing medical oxygen.

The zeolitic adsorbent material according to the present invention therefore finds an especially advantageous application as an adsorption element in oxygen concentrators for respiratory assistance. According to a particularly advantageous aspect of the invention, the zeolitic adsorbent material according to the invention constitutes the active material of a consumable cartridge of zeolitic adsorbent, which can be inserted into an oxygen concentrator for respiratory assistance, whether this concentrator is stationary, transportable or mobile, preferably portable.

The consumable cartridge of zeolitic adsorbent may have any form suitable for easy insertion and replacement in oxygen concentrators for respiratory assistance. According to one embodiment, said cartridge may be prepared starting from the zeolitic adsorbent material according to the invention in the form of beads which are made mutually cohesive by means of at least one resin, preferably a polymeric resin preferably chosen from thermoplastic homopolymers and/or copolymers and polycondensates.

Non-limiting examples of such polymeric resins are polyolefins, particularly low- and/or high- and/or ultra-high-density polyethylene, polypropylene, ethylene copolymers, ethylene-vinyl acetate copolymers, polyacrylics, acrylonitrile homo- and/or copolymers, polyacrylates, polymethacrylates, acrylate copolymers and/or methacrylate copolymers, polystyrenes and/or styrene copolymers, polyesters, e.g. polyethylene terephthalate, polybutylene terephthalate, halogenated polymers and copolymers such as poly(vinylidene difluoride) (PVDF) polymers, poly(tetrafluoroethylene) (PTFE) polymers and/or copolymers, polyamides, such as polyamide-11 and polyamide-12, and also other even- and odd-numbered polyamides, aromatic polyamides, polyvinyl chlorides, polyurethanes, polyethersulfones, polyetherketones, polycarbonates, epoxy resins, phenolic resins, thermosetting resins and elastomeric resins, and the like, and also mixtures of two or more of these in any proportions.

According to yet another aspect, the invention relates to an oxygen concentrator for respiratory assistance that is transportable, mobile, preferably portable, comprising at least one zeolitic adsorbent material, or at least one fixed adsorption bed, or at least one composite material, or at least one cartridge, of the kind just described above.

As a variant, the zeolitic material that may be used in the context of the present invention may be used in the form of adsorbent layers (also known as adsorbent beds), preferably with one or two, three or more other adsorbent layers. The other adsorbent(s) may be of any type known to those skilled in the art, and non-limiting examples that may be mentioned include adsorbents comprising zeolites chosen from CaLSX, LiTrLSX, 5A, NaX, LiX, LiAgLSX, LiLSX and LiCaLSX.

According to a most particularly preferred aspect, the use according to the present invention uses an adsorbent as defined previously as a double layer with an adsorbent based on LiLSX, thus forming an NaLSX/LiLSX or NaMSX/LiLSX double layer, preferably an NaLSX/LiLSX double layer, and more preferably an NaLSX/LiLSX double layer wherein the NaLSX/LiLSX ratio is between 5/95 and 95/5 and better still between 50/50 and 95/5 by weight.

It has been observed that the zeolitic adsorbent material based on NaLSX and/or NaMSX, as has just been defined, has an oxygen adsorption capacity inferior to that of the adsorbent materials that are currently available, in the use for nitrogen/oxygen separation, according to the present invention, while at the same time conserving a very good nitrogen adsorption capacity.

This low oxygen adsorption capacity, coupled with a good nitrogen adsorption capacity, makes the zeolitic adsorbent material based on NaLSX and/or NaMSX entirely competitive, relative to the zeolitic adsorbents commonly used at the present time for nitrogen/oxygen separation and which usually contain lithium in relatively appreciable amount. The reason for this is that the zeolitic adsorbent material used in the invention does not contain any lithium or else contains very small amounts thereof, and as such its manufacturing cost makes it entirely advantageous to users.

According to yet another aspect, the invention relates to an oxygen concentrator for respiratory assistance that is transportable, mobile, preferably portable, comprising at least one zeolitic adsorbent material, or at least one fixed adsorption bed, or at least one composite material, or at least one cartridge, of the kind just described above.

A concentrator that is most particularly suitable for the separation of nitrogen and oxygen ($N_2/O_2$), and notably for the preparation of medical oxygen from air, and also for the industrial preparation of oxygen by (V)PSA comprises an NaLSX/LiLSX or NaMSX/LiLSX double layer, preferably an NaLSX/LiLSX double layer, and more preferably an NaLSX/LiLSX double layer wherein the NaLSX/LiLSX ratio is between 5/95 and 95/5 and better still between 50/50 and 95/5 by weight.

The physical properties of the zeolitic adsorbent material that may be used in the context of the present invention are evaluated by methods known to those skilled in the art, the main ones among them being recited below.

The examples that follow serve to illustrate the invention that has just been described above, and are not intended to limit the scope of protection imparted by the appended claims.

Characterization Techniques—Analytical Methods

The physical properties of the zeolitic agglomerated material according to the invention are evaluated by methods known to those skilled in the art, the main ones among them being recited below.

The number-average diameter of the zeolite crystals which are used for preparing the zeolitic agglomerated material of the invention is estimated by observation under the scanning electron microscope (SEM).

In order to estimate the size of the zeolite crystals on the samples, a set of images is taken at a magnification of at least 5000. The diameter of at least 200 crystals is then measured using dedicated software, for example the Smile View software published by LoGraMi. The accuracy is of the order of 3%.

The size recorded for each crystal is that of the longest cross section of said crystal in question. Particles with a size of less than 0.5 µm which might possibly be present in the zeolitic agglomerated material are not taken into consideration in the counting.

The resulting particle size distribution is equivalent to the mean of the particle size distributions observed for each of the images. The peak width and the number-average diameter are calculated by conventional methods known to those skilled in the art, applying the statistical rules of Gaussian distribution.

Elemental chemical analysis of a zeolitic agglomerated material according to the invention may be carried out according to various analytical techniques which are known to those skilled in the art. These techniques include the technique of chemical analysis by X-ray fluorescence as described in standard NF EN ISO 12677:2011 on a wavelength-dispersive spectrometer (WDXRF), for example Tiger S8 from Brüker.

X-ray fluorescence is a non-destructive spectral technique which exploits the photoluminescence of the atoms in the X-ray range, to establish the elemental composition of a sample. Excitation of the atoms, generally with an X-ray beam or by electron bombardment, generates specific radiations after return to the ground state of the atom.

Other methods of analysis are for example illustrated by the atomic absorption spectrometry (AAS) and inductively coupled plasma atomic emission spectrometry (ICP-AES) methods described in standards NF EN ISO 21587-3 or NF EN ISO 21079-3 on a machine of for example Perkin Elmer 4300DV type.

The X-ray fluorescence spectrum has the advantage of depending very little on the chemical combination of the element, which offers a precise determination, both quantitatively and qualitatively. After calibration for each oxide $SiO_2$ and $Al_2O_3$, and also the various oxides (such as those originating from the exchangeable cations, for example sodium), a measurement uncertainty of less than 0.4% by weight is conventionally obtained.

Thus, the elemental chemical analyses described above make it possible to verify both the Si/Al ratio of the zeolite used within the zeolitic agglomerated material and the Si/Al ratio of the zeolitic agglomerated material. In the description of the present invention, the measurement uncertainty for the Si/Al ratio is ±5%. The Si/Al ratio of the zeolite present in the agglomerated material may also be measured by solid silicon nuclear magnetic resonance (NMR) spectroscopy.

The quality of the ion exchange is linked to the number of moles of the cation in question in the zeolitic agglomerated material after exchange. More specifically, the degree of exchange by a given cation is estimated by evaluating the ratio between the number of moles of said cation and the number of moles of all of the exchangeable cations. The respective amounts of each of the cations are evaluated by chemical analysis of the corresponding cations. For example, the degree of exchange by the sodium ions is estimated by evaluating the ratio between the total number of $Na^+$ cations and the total number of exchangeable cations (for example $Ca^{2+}$, $K_+$, $Li_+$, $Ba^{2+}$, $Cs^+$, $Na^+$, etc.), the amount of each of the cations being evaluated by chemical analysis of the corresponding oxides ($Na_2O$, $CaO$, $K_2O$, $BaO$, $Li_2O$, $Cs_2O$, etc.). This calculation method also takes into account the possible oxides present in the residual binder of the zeolitic agglomerated material.

The bulk crush strength of the zeolitic adsorbent materials as described in the present invention is characterized according to standard ASTM 7084-04.

The bulk density of the zeolitic agglomerated material according to the present invention is measured as described in standard DIN 8948/7.6.

The purity of the zeolites in the zeolitic adsorbent materials of the invention is evaluated by X-ray diffraction analysis, known to those skilled in the art by the acronym XRD. This identification is performed on a Bruker brand XRD machine.

This analysis makes it possible to identify the various zeolites present in the agglomerated material since each of the zeolites has a unique diffractogram defined by the positioning of the diffraction peaks and by their relative intensities.

The zeolitic adsorbent materials are ground and then spread out and smoothed on a sample carrier by simple mechanical compression. The conditions under which the diffractogram created on the Brüker D8 Advance machine is acquired are as follows:
Cu tube used at 40 kV–30 mA;
Soller slit size=2.5°, with an irradiation surface width of 16 mm;
sample device rotating at: 10 rpm;
measuring range: 4°<2θ<70°;
increment: 0.015°;
counting time per increment: 0.8 seconds.

Interpretation of the diffractogram obtained is performed with the EVA software with identification of the zeolites using the ICDD PDF-2 release 2011 database.

The amount of the FAU zeolite fractions, by weight, is measured by X-ray fluorescence or XRD analysis; the latter method may also be used to measure the amount of the zeolite fractions other than FAU. The XRD analysis is generally performed on a Bruker machine, and the weight amount of the zeolite fractions is then evaluated using the TOPAS software from Brüker.

Prior to the adsorption, the zeolitic agglomerated material is degassed at between 300° C. and 450° C. for a time of between 9 hours and 16 hours under vacuum (pressure lower than $6.7.10^{-4}$ Pa). The adsorption isotherms are then measured on a Hiden Isochema brand IGA machine, taking at least 10 measurement points at pressures of between 0 and 4 bar (0.4 MPa). The mass adsorption capacity of the zeolitic agglomerated material is read off on the isotherm at 25° C. under a pressure of 4 bar, and is expressed in $Ncm^3 \cdot g^{-1}$.

The mass adsorption capacity at 25° C., under 4 bar (0.4 MPa), of the zeolitic agglomerated material is determined from the measurement of the adsorption isotherm for gases, such as nitrogen or oxygen, at 25° C.

The average volume diameter (or "volume-average diameter") of the zeolitic agglomerated material of the invention is determined by analysis of the particle size distribution of a sample of adsorbent material by imaging in accordance with standard ISO 13322-2:2006, using a conveyor belt which allows the sample to pass in front of the camera lens.

The volume-average diameter is then calculated from the particle size distribution by applying standard ISO 9276-2:2001. In the present document, the term "volume-average diameter" or else "size" is used for the zeolitic adsorbent materials. The accuracy is of the order of 0.01 mm for the size range of the zeolitic adsorbent materials of the present invention.

EXAMPLES

Adsorbent A: NaLSX-Si/Al Ratio=1.00 (According to the Invention)

A homogeneous mixture is prepared, consisting of 1700 g of LSX zeolite crystals with a number-mean diameter ($d_{50}$)=7 μm, according to the procedure described in patent application WO 2009/081022, with 300 g of Zeoclay® attapulgite, and also the amount of water such that the loss on ignition of the paste before forming is 39%. The paste thus prepared is used to produce beads of zeolitic agglomerated material.

The beads obtained are selected by sieving in order to collect beads with a diameter of between 0.2 mm and 0.8 mm.

The beads are dried overnight in a ventilated oven at 80° C. They are subsequently calcined at 550° C. for 2 hours under a blanket of decarbonated dry air.

Next, five successive exchanges are performed using 2 M sodium chloride solutions, in a proportion of 20 $mL \cdot g^{-1}$ of solid. Each exchange is continued for 4 hours at 100° C., and intermediate washes are carried out, thus making it possible to remove the excess salt at each step. In the final step, four washes are carried out at room temperature, in a proportion of 20 $ml \cdot g^{-1}$. The degree of sodium exchange is 99.6%.

The beads are dried overnight in a ventilated oven at 80° C. They are then activated at 550° C. for 2 hours under a blanket of decarbonated dry air.

Adsorbent B: NaX—Si/Al Ratio=1.24 (Comparative Example)

A homogeneous mixture is prepared, consisting of 1700 g of type X zeolite crystals with a number-mean diameter ($d_{50}$)=1.8 μm and an Si/Al ratio=1.24 as prepared in Example 1 of U.S. Pat. No. 10,300,455 B2, with 300 g of Zeoclay® attapulgite, and also the amount of water such that the loss on ignition of the paste before forming is 39%. The paste thus prepared is used to produce beads of zeolitic agglomerated material. The beads obtained are selected by sieving in order to collect beads with a diameter of between 0.2 mm and 0.8 mm. The degree of sodium exchange is 100%.

The beads are dried overnight in a ventilated oven at 80° C. They are then calcined and activated at 550° C. for 2 hours under a blanket of decarbonated dry air.

Adsorbent C: NaMSX-Si/Al Ratio=1.13 (According to the Invention)

A homogeneous mixture is prepared, consisting of 1700 g of MSX zeolite crystals (Si/Al=1.13) prepared according to Table 4 Example 26 of U.S. Pat. No. 6,596,256, with 300 g of Zeoclay® attapulgite, and also the amount of water such that the loss on ignition of the paste before forming is 39%. The paste thus prepared is used to produce beads of zeolitic agglomerated material.

The beads obtained are selected by sieving in order to collect beads with a diameter of between 0.2 mm and 0.8 mm.

The beads are dried overnight in a ventilated oven at 80° C. They are then calcined and activated at 550° C. for 2 hours under a blanket of decarbonated dry air. The degree of sodium exchange is 100%.

Example 1: Mass Adsorption Isotherms of Nitrogen and Oxygen

The adsorption isotherms for each of the adsorbents A, B and C are plotted according to the conditions described above, using the Hiden Isochema brand IGA machine. The nitrogen ($N_2$) and oxygen ($O_2$) isotherms are reported on the graph in the FIGURE.

It emerges very clearly that adsorbents A, B and C have entirely similar behavior as regards the nitrogen adsorption capacities. On the other hand, it is observed, entirely surprisingly, that adsorbents A and C according to the invention have oxygen adsorption capacities that are far inferior to those observed with the comparative adsorbent B. Adsorbents A (NaLSX) and C (NaMSX) according to the invention, while being just as efficient as the comparative adsorbent B (NaX) as regards nitrogen adsorption, entirely unexpectedly show lower adsorption capacity with respect to oxygen.

Thus, the zeolitic adsorbents that may be used in the context of the present invention are particularly suitable for use in medical oxygen concentrators, where nitrogen is retained on the adsorbents, whereas oxygen is much less retained, and can thus be available more directly from a machine for separating the oxygen from air.

This surprising effect is particularly visible with the adsorption capacity measurements taken at a pressure above 1.5 bar (0.15 MPa), preferably above 2 bar (0.2 MPa), more preferably above 2.5 bar (0.25 MPa), better still above 3 bar (0.3 MPa), more preferentially above 3.5 bar (0.35 MPa) and typically above 4 bar (0.4 MPa), which makes it possible to envisage optimum working pressures in the uses envisaged in the context of the invention and notably for medical oxygen concentrators, as already indicated above.

Table 1 below collates the mass adsorption capacity values for nitrogen and oxygen, measured at 4 bar (0.4 MPa).

TABLE 1

| Adsorbent | Si/Al ratio | $N_2$ capacity | $O_2$ capacity |
|---|---|---|---|
| A | 1.00 | 24.0 | 8.5 |
| B | 1.24 | 24.5 | 12.0 |
| C | 1.13 | 24.4 | 9.5 |

It emerges clearly that the oxygen mass adsorption capacity is proportionately smaller when the Si/Al mole ratio is less than 1.20, preferably less than 1.15 and more preferably less than 1.12, whereas the nitrogen mass adsorption capacity remains substantially constant. There is thus great interest in using adsorbents of which the Si/Al mole ratio is less than 1.20, preferably less than 1.15 and more preferably less than 1.12, i.e. adsorbents based on NaLSX or NaMSX zeolites, and preferably based on NaLSX zeolites, for the preparation of medical oxygen obtained by separation of the gases from air.

The invention claimed is:

1. A method for non-cryogenic separation of industrial gases by (V) PSA and for industrial preparation of oxygen by (V) PSA, comprising contacting the industrial gases with a zeolitic adsorbent material, where the zeolitic adsorbent material:
   is based on faujasite (FAU) zeolite crystals, the Si/Al mole ratio of which is between 1.00 and 1.13, limits inclusive, where the crystals are chosen from NaLSX type crystals and NaMSX type crystals,
   has a content of non-zeolite phase (NZP) such that 0<NZP≤10%, by weight relative to the total weight of the zeolitic adsorbent material,
   is present as adsorbent layers, and
   has a bulk density of between 0.55 g·cm$^{-3}$ and 0.70 g·cm$^{-3}$,
   wherein sodium content of the zeolitic adsorbent material is greater than 95%, limits inclusive, the sodium content being expressed as a percentage of exchangeable sites, and
   wherein the zeolitic adsorbent material has a measured nitrogen ($N_2$) mass adsorption capacity under 4 bar (0.4 MPa) at 25° C. of greater than 23 Ncm$^3$·g$^{-1}$.

2. The method as claimed in claim 1, wherein the zeolitic adsorbent material has a volume-mean diameter of less than or equal to 7 mm.

3. The method as claimed in claim 1, where the zeolitic adsorbent material is present as an adsorption element in oxygen concentrators for respiratory assistance.

4. The method as claimed in claim 1, wherein other adsorbent(s) are present and comprise zeolites chosen from CaLSX, LiTrLSX, 5A, NaX, LiX, LiAgLSX, LiLSX and LiCaLSX.

5. The method as claimed in claim 1, wherein the adsorbent is present in a double layer with another adsorbent based on LiLSX, forming a NaLSX/LiLSX or NaMSX/LiLSX double layer, wherein the NaLSX/LiLSX ratio is between 5/95 and 95/5.

6. A transportable or mobile oxygen concentrator for respiratory assistance comprising at least one zeolitic adsorbent material, where the zeolitic adsorbent material:
   is based on faujasite (FAU) zeolite crystals, the Si/Al mole ratio of which is between 1.00 and 1.13, limits inclusive, where the crystals are chosen from NaLSX type crystals and NaMSX type crystals,
   has a content of non-zeolite phase (NZP) such that 0<NZP≤25%, by weight relative to the total weight of the zeolitic adsorbent material, is present as adsorbent layers, and has a bulk density of between 0.55 g·cm$^{-3}$ and 0.70 g·cm$^{-3}$, and wherein sodium content of the zeolitic adsorbent material is greater than 95%, limits inclusive, the sodium content being expressed as a percentage of exchangeable sites, and wherein the zeolitic adsorbent material has a measured nitrogen (N$_2$) mass adsorption capacity under 4 bar (0.4 MPa) at 25° C. of greater than 23 Ncm$^3$·g$^{-1}$.

7. The concentrator according to claim 6, comprising a NaLSX/LiLSX or NaMSX/LiLSX double layer, wherein the NaLSX/LiLSX ratio is between 5/95 and 95/5.

* * * * *